(12) United States Patent
Desai (10) Patent No.: US 7,797,376 B1
(45) Date of Patent: Sep. 14, 2010

(54) ARRANGEMENT FOR PROVIDING CONTENT OPERATION IDENTIFIERS WITH A SPECIFIED HTTP OBJECT FOR ACCELERATION OF RELEVANT CONTENT OPERATIONS

(75) Inventor: Arun Raghavendra Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 2484 days.

(21) Appl. No.: 09/986,967

(22) Filed: Nov. 13, 2001

(51) Int. Cl.
*G06F 15/16* (2006.01)
(52) U.S. Cl. .................. 709/203; 709/213; 709/246
(58) Field of Classification Search ............ 709/203, 709/213–216, 246
See application file for complete search history.

(56) References Cited

U.S. PATENT DOCUMENTS

| | | | |
|---|---|---|---|
| 5,802,292 A | | 9/1998 | Mogul |
| 5,852,717 A | * | 12/1998 | Bhide et al. ............... 709/203 |
| 5,897,634 A | * | 4/1999 | Attaluri et al. ............... 707/8 |
| 6,026,413 A | * | 2/2000 | Challenger et al. .......... 707/202 |
| 6,085,193 A | * | 7/2000 | Malkin et al. ............... 707/10 |
| 6,154,742 A | * | 11/2000 | Herriot .................... 707/10 |
| 6,249,844 B1 | * | 6/2001 | Schloss et al. ............... 711/122 |
| 6,629,138 B1 | * | 9/2003 | Lambert et al. ............. 709/224 |
| 6,757,708 B1 | * | 6/2004 | Craig et al. ................. 709/203 |
| 6,871,236 B2 | * | 3/2005 | Fishman et al. ............. 709/246 |
| 2002/0004917 A1 | * | 1/2002 | Malcolm et al. ............... 714/4 |
| 2003/0061451 A1 | * | 3/2003 | Beyda ....................... 711/137 |

* cited by examiner

*Primary Examiner*—John Follansbee
*Assistant Examiner*—Nghi V Tran
(74) *Attorney, Agent, or Firm*—Leon R. Turkevich (57) ABSTRACT

Web content provided by a server includes associated content operation identifiers that identify related content objects. The web server, in response to receiving an HTTP Get request for the web object, retrieves the web object, and concurrently retrieves the content operation identifiers associated with the web object. The server sends the content operation identifiers with the requested web object as part of an HTTP response. The content operation identifiers may be inserted with an HTTP header, or may be added to the web content, for example by prepending HTML tags specifying the content operation identifiers to an HTML page that includes the requested web object. A proxy device receiving the HTTP response can forward the response to the requesting client device, and execute the content operations specified by the content operation identifiers within the HTTP response. Hence, content operations can be performed for relevant content objects based on content operation identifiers within the HTTP response, eliminating the necessity of client side executable resources that may otherwise affect the device performance.

10 Claims, 5 Drawing Sheets

```
<html>
  <head>
    <title>
    CDN Company Homepage
    </title>
  </head>
  <body>
  This is a home page.......
  </body>
</html>
```
← 34

Figure 3A

```
<RelatedUrlTag>   ← 40
    <!-- 3 ACTION=PREFETCH
    http://www.cdn1.com/HomePgGif1.gif
    http://www.cdn1.com/HomePgGif2.gif
    http://www.cdn2.com/JpegImage1.jpg   -->
    <!--2 ACTION=PURGE
    http:/www.cdn1.com/Old_HomePgGif1.gif
    http:/www.cdn1.com/Old_HomePgGif2.gif   -->
</RelatedUrlTag>   ← 40'
<html>
  <head>
    <title>
    CDN Company Homepage
    </title>
  </head>
  <body>
  This is a home page.......
  </body>
</html>
```

ARRANGEMENT FOR PROVIDING CONTENT OPERATION IDENTIFIERS WITH A SPECIFIED HTTP OBJECT FOR ACCELERATION OF RELEVANT CONTENT OPERATIONS

BACKGROUND OF THE INVENTION

1. Field of the Invention

The present invention relates to caching systems, for example proxy devices, configured for accelerating delivery of content supplied by a web server and requested by a user according to Hypertext Transport Protocol (HTTP).

2. Description of the Related Art

Networking communications technology is undergoing substantial changes in an effort to provide more efficient delivery of content such as web objects based on Hypertext Markup Language (HTML) tags or Extensible Markup Language (XML) tags. Such changes include deploying HTTP proxy caches configured for caching web objects retrieved from web pages.

Proxy cache devices have been used for caching of HTML or HTTP objects. In particular, such objects typically are transferred according to HTTP protocol, based on HTTP headers specifying whether the corresponding web object is cacheable. An HTTP proxy cache is a device that acts as a proxy on behalf of a client machine, for example a browser device operated by a user. The HTTP proxy cache, in response to receiving a request, determines whether the requested web content is cached within locally accessible storage devices; if the requested web content is not cached locally (i.e., a cache miss), the HTTP proxy cache fetches the requested web object from the web server specified by the client, stores the web object in local storage, and forwards a copy of the fetched web content to the client. In response to receiving a subsequent HTTP get request from a client device for the cached web object (i.e., a cache hit), the HTTP proxy cache fetches the web object from its local storage, and forwards the cached web object to the browser. Hence, the cached web content eliminates the necessity of accessing the web server, as long as the locally stored web content is considered fresh (i.e., not stale).

One problem encountered with existing proxy cache techniques is that the attempted acceleration of web content, as perceived by a user of a web browser, requires that a request for the web content to have been previously requested by a client device. Hence, a client device cannot enjoy any of the benefits of proxy caching if a prior client device has not previously requested the same web content.

One proposed solution from Fireclick, Inc., Los Altos, Calif., involves a commercially available product, known as BLUEFLAME™, utilizes predictive caching, in which an executable resource on the client device (e.g., a java applet), prefetches the content to the browser using a proprietary communications mechanism between the client and the web server. The BLUEFLAME™ technology also uses server side statistical analysis algorithms to accelerate content. Use of a java applet executable within a client browser to prefetch content, however, can substantially degrade performance of the client browser, especially if other java applets are concurrently executing to provide an application operation for the existing web page of the client browser.

SUMMARY OF THE INVENTION

There is a need for an arrangement that enables content acceleration of web objects to minimize latencies encountered by client devices requesting web objects, without the necessity of downloading and executing locally executable resources that may affect device performance.

There also is a need for an arrangement that enables a device to efficiently perform content operations relative to a specified HTTP object, without requiring initiation of another executable process for accelerating the content operations.

These and other needs are attained by the present invention, where web content provided by a server includes associated content operation identifiers that identify related content objects. The web server, in response to receiving an HTTP Get request for the web object, retrieves the web object, and concurrently retrieves the content operation identifiers associated with the web object. The server sends the content operation identifiers with the requested web object as part of an HTTP response. The content operation identifiers may be inserted with an HTTP header, or may be added to the web content, for example by prepending HTML tags specifying the content operation identifiers to an HTML page that includes the requested web object. A proxy device receiving the HTTP response can forward the response to the requesting client device, and execute the content operations specified by the content operation identifiers within the HTTP response. Hence, content operations can be performed for relevant content objects based on content operation identifiers within the HTTP response, eliminating the necessity of client side executable resources that may otherwise affect the device performance. In addition, the supply of content operation identifiers in the HTTP response enables content acceleration to be implemented in an efficient and scalable manner without affecting existing operations, since any content operation identifiers not recognizable by a receiving device (e.g., a client browser) are ignored without adverse effects to the device.

One aspect of the present invention provides a method of providing content to a device according to Hypertext Transport Protocol (HTTP). The method includes receiving an HTTP request for a first content object, and identifying a content operation identifier that identifies a corresponding second content object determined as relevant to the first content object. The method also includes sending to the device an HTTP response to the HTTP request, the HTTP response including the first content object and the content operation identifier. Hence, the HTTP response enables the device to perform the content operation associated with the second content object based on receipt of the content operation identifier.

Another aspect of the present invention provides a method of retrieving content for a device according to Hypertext Transport Protocol. The method includes first sending an HTTP request for a first content object, received from the device, to a destination server specified by the HTTP request. The method also includes receiving from the destination server an HTTP response to the HTTP request that includes the first content object and a content operation identifier that specifies an operation to be performed on an identified second content object. The method also includes sending the first content object the device, and executing the operation on the second content object in response to the content operation identifier.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
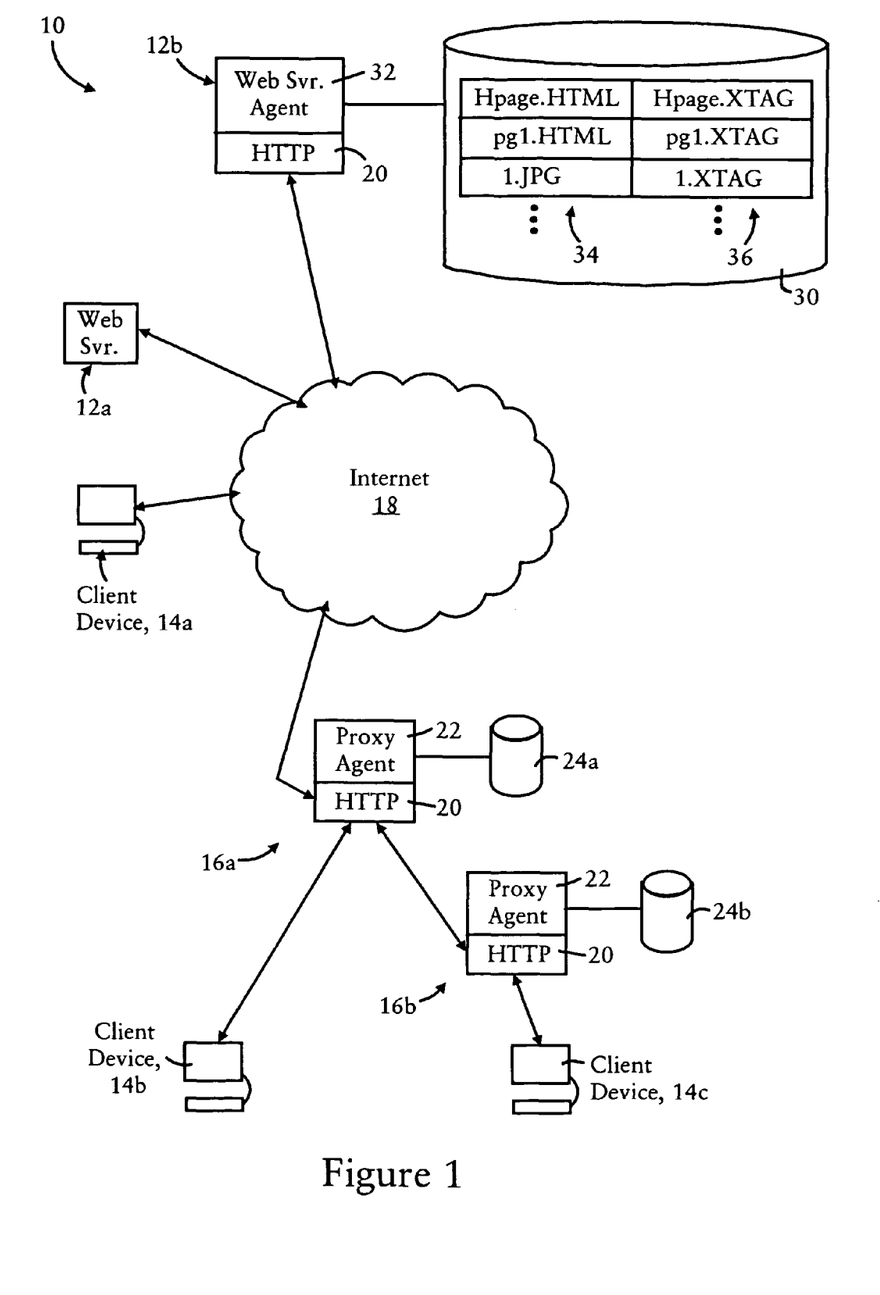
FIG. 1 is a block diagram illustrating a system of providing content to a device based on using content operation identifiers to accelerate content operations associated with relevant requested content objects, according to an embodiment of the present invention.

FIG. 1 is a block diagram illustrating a network based system 10 configured for providing HTTP based content using proxy devices configured for executing accelerated content operations using content operation identifiers, according to an embodiment of the present invention. The system includes web servers 12 configured for supplying content objects (e.g., HTML based web pages, graphic media files, audio media files, video media files, etc.). The web servers 12 are configured for outputting the web content as a response to a request, for example an HTTP Get request from an identified destination.

The system 10 also includes client devices 14 configured for generating the HTTP Get requests based on user inputs, and proxy devices 16 configured for providing accelerated content operations based on caching relevant web documents, described below. The system also includes an open protocol wide area network 18 configured for transporting the HTTP requests and responses between the web servers 12 and the requesting device 14 and/or 16.

Each web server 12 is configured for providing content to the requesting device that includes the requested content object (e.g., a web page), plus content operation identifiers that identify respective content objects determined as relevant to the requested content object. Hence, the web server 12, in response to an HTTP Get request, sends a response to the HTTP Get request that includes the requested web object, plus the content operation identifiers identifying the content objects deemed relevant to the requested content object; as described below with respect to FIG. 2A, the content operation identifiers may be implemented in the form of HTML tags; alternately, the content operation identifiers may be specified in the form of HTTP response headers. If the HTTP response offered by the web server 12 is sent to a device that is unable to recognize the content operation identifiers, for example a client device 14a executing a browser resource having limited functionalities and having a direct connection to the Internet 18, the browser of the client device 14a merely displays the requested content object and ignores the unrecognized content operation identifiers.

However, if the HTTP response including the content object and the relevant content operation identifiers are received by a device (e.g., the proxy device 16) configured for identifying the content operation identifiers, either as extensible HTTP headers and/or prescribed HTML (or XML) tags, a proxy device 16 sends a copy of the HTTP response to the requesting device (e.g., client device 14b), and executes the content operation specified by the content identifier. As described below, the content operations may include prefetching an identified content object, or purging from a local cache and existing cache content object that may have been deemed to be stale.

Hence, content operations can be accelerated based on receipt of an HTTP response that includes the requested web object, and content operation identifiers that identify content operations for content objects relevant to the requested content object. Consequently, content operations can be accelerated without the necessity of separate executable resources residing on a client device 14 or a separate executable resource that executes in conjunction with existing proxy operations; rather, since a proxy device 16 already is configured for parsing an HTTP header to determine the destination of a received HTTP response, the proxy device 16 can identify the content operation identifiers, and execute the respective specified content operations in response to the content operation identifiers.

As illustrated in FIG. 1, each proxy device 16 includes an HTTP interface 20 configured for receiving an HTTP request from a requesting device, for example a client device 14 or an intermediate proxy 16b. As illustrated in FIG. 1, the proxy device 16a is configured for receiving HTTP requests from the client device 14c via the proxy device 16b; hence, depending on network implementation, a network designer may decide to implement the same proxy operations within the proxy devices 16a and 16b; alternately, different proxy operations may be executed within the respective proxy devices, for example the proxy device 16a configured for providing content acceleration, and the proxy device 16b configured for providing security access.

As described in detail below with respect to FIG. 4B, each proxy device 16 also includes an executable resource 22 configured for parsing the HTTP headers for execution of proxy operation, including storing content to be cached in a local storage device 24, and fetching the cached content from the local storage device 24 in response to a local HTTP Get request for the cached content.

The web server 12 is configured for providing the content to the devices, including the requested content objects and the content operation identifiers, based on retrieval of the content from a mass storage device 30. In particular, the web server 12 includes an HTTP interface 20 configured for receiving an HTTP Get request and outputting a response to the HTTP Get request, and an executable resource 32. The executable resource 32 is configured for identifying the content operation identifiers identifying the content objects relevant to the requested web object. In particular, the server process 32 is configured for storing into the storage device 30 content files 34 that store web content objects (e.g., HTML files, media files such as .gif, .jpg, .wav files, etc.). The server process 32 also stores, for each content file 34, a corresponding tag file 36, also referred to as an .XTAG file, configured for storing the content operation identifiers relevant to the corresponding content object(s) stored in the corresponding content files 34.

Hence, the server process 32, upon retrieving a content file 34 for generation of a response to an HTTP Get request, also retrieves the corresponding tag file 36 to supply the requested content object and the content operation identifiers. As apparent from the foregoing, the disclosed arrangement enables the content identifiers to be provided with the web objects, regardless of whether the server process 32 is configured for outputting static web pages stored as HTML files, or dynamically generating web pages using the media content stored in the storage device 30.

Figure 2A:
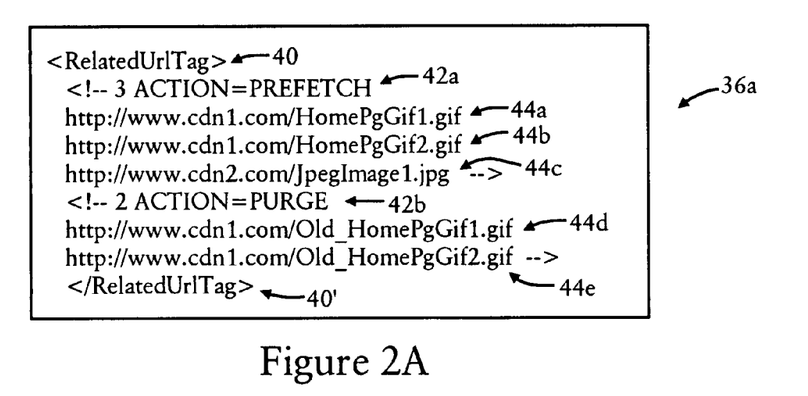
FIGS. 2A and 2B are diagrams illustrating tag files having content operation identifiers that identify content objects relevant to a referenced content object, according to HTML protocol and HTTP protocol, respectively.
Figure 2B:
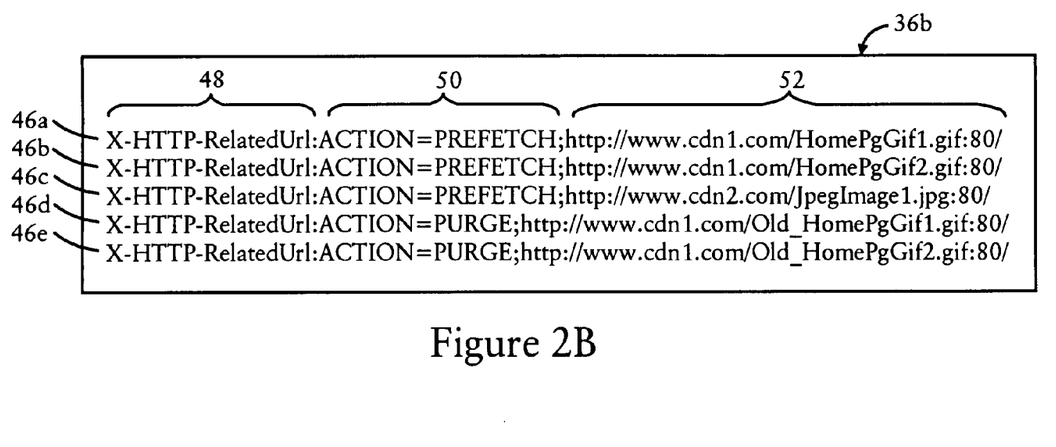

FIGS. 2A and 2B are diagrams illustrating tag files 36 stored in the storage medium 30 for use by the server process 32 according to HTML protocol and HTTP protocol, respectively. In particular, FIG. 2A is a diagram of a tag file 36a having HTML tags that enables an executable resource 22 of the proxy device 16 to identify the content operations to be performed. In particular the HTML tags include a content operation tag 40 that specifies operations for related web objects. The content operation tag 40 includes a directive tag 42 that specifies the content operation to be performed, and object identifiers 44, implemented as uniform resource identifiers (URIs), that specify the location of the relevant content object. For example, the tag file 36a includes a content operation tag 40 that includes a directive tag 42a specifying a prefetch operation, and a directive tag 42b specifying purging of cached web content.

Hence, the prefetch directive 42a directs a device, for example the proxy device 16a, to prefetch the content objects at the locations specified by the object identifiers 44a, 44b, and 44c; the content operation tag 40 also specifies for the proxy device 16a to purge from its local cache 24a the stale content objects identified by the object identifiers 44d and 44e.

Figure 3A:
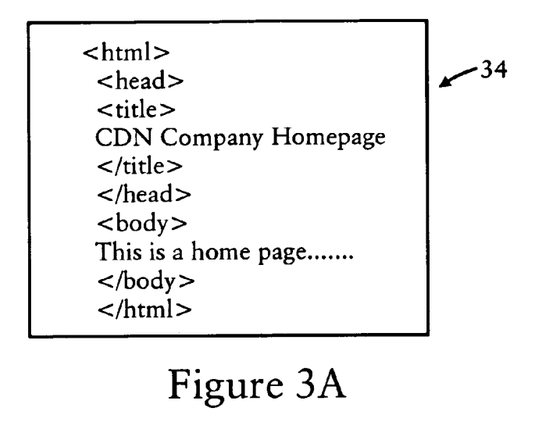
FIGS. 3A and 3B are diagrams illustrating a requested web page and the requested web page having content operation identifiers added as inline prepended text, respectively.
Figure 3B:
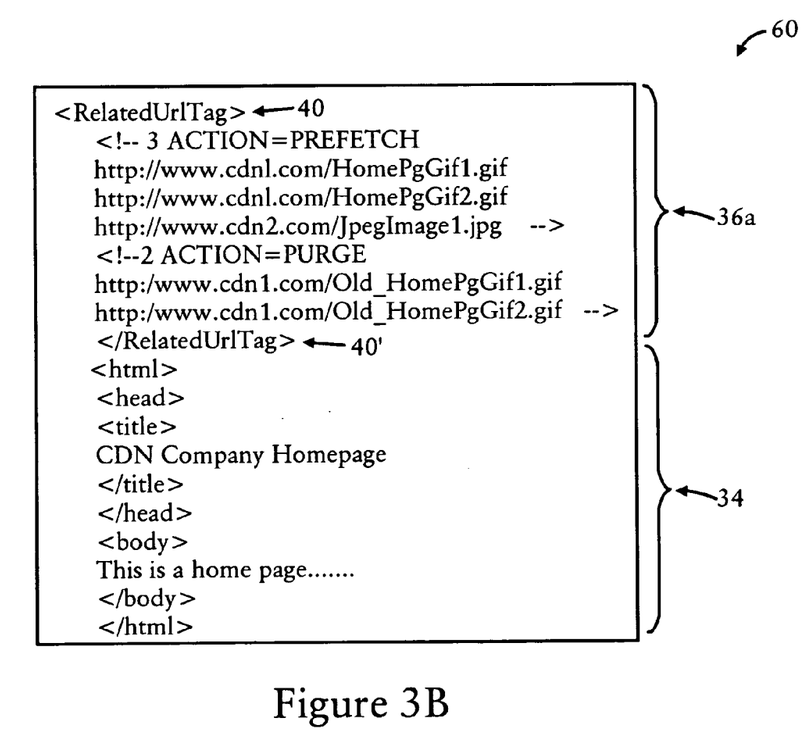

The tag file 36a of FIG. 2A has the advantage that the contents of the tag file 36a can easily be implemented by inline prepending the tag 40 into the HTML document 34 output by the server 12b in response to the HTTP Get request, illustrated below with respect to FIGS. 3A and 3B. The tag file 36a also has the advantage that a webmaster easily may update the content file 34 by copying the tag file 36a into the content file 34, as shown in FIG. 3B, resulting in a new content file 60 containing the original content file 34 and all the necessary prefetching information for a proxy device, or a client device 14, upon parsing the HTML page.

Instances may arise, however, where it is preferred not to modify the HTML (or XML based) content, for example due to copyright restrictions. In addition, the requested content may utilize a format that precludes inline prepending of tags, for example media formats such as .JPG, .GIF, etc. In such cases, it may be preferable to provide the content operation identifier distinct from the content itself by inserting the content operation identifiers into the HTTP header of the response output by the web server 12b.

FIG. 2B is a diagram illustrating a tag file 36b that includes extensible HTTP header 46 for insertion into the header portion of an HTTP response by the server process 32. In contrast to the tag file 36a, the tag file 36b includes extensible HTTP headers 46, each including a header attribute 48, a directive 50, and an object identifier 52. The header attribute identifies for the HTTP parser in the proxy resource 22 the extensible type of HTTP header being utilized, in accordance with RFC 2068, "HTTP 1.1 Protocol", published by the Network Working Group of the Internet Engineering Task Force. The directive 50 is configured for identifying the corresponding content operation to be performed by the device, and the object identifier 52 is configured for specifying the location of relevant content object. Hence, the headers 46a, 46b, 46c, 46d, and 46e specify the same content operation to be performed for the same respective content objects as identified in the identifiers 44a, 44b, 44c, 44d, and 44e, respectively.

Hence, the server process 32 can provide content identifiers either by inline prepending tags into an HTML document, or by insertion of HTTP headers. As illustrated in FIGS. 3A and 3B, the content file 34, serving as the requesting content object, may be inline prepended in FIG. 3B with the tag file 36a, resulting in the modified HTML page 60. Hence, a proxy device configured for recognizing the content operation tags 40 can parse the tags and perform the specified content operations; as recognized in the art, if the content operation tags 40 are unrecognizable by the device, for example by a browser of the client device 14a, then the unrecognizable tags are merely ignored, without adverse effect to presentation of the HTML based content object 34 on the browser.

Figure 4A:
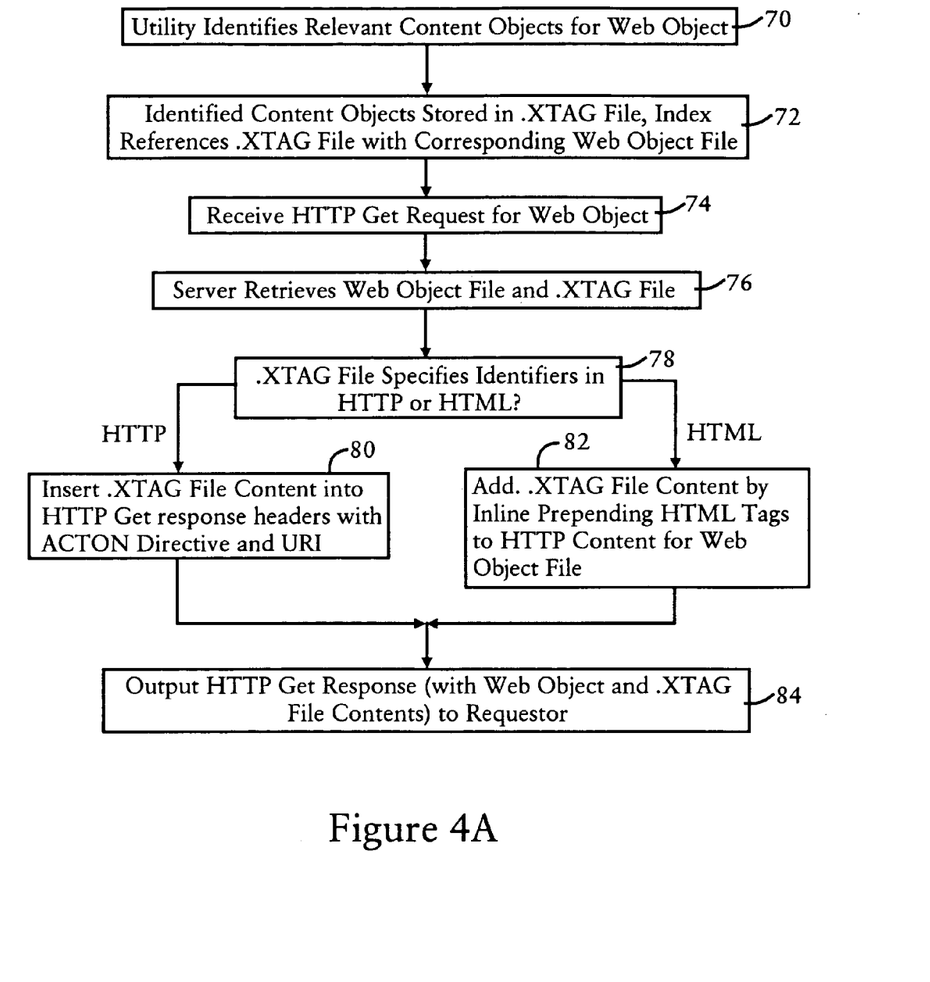
FIGS. 4A and 4B are flow diagrams summarizing the methods by the web server and the proxy device of FIG. 1 for accelerating relevant content operations using content operation identifiers, according to an embodiment of the present invention.
Figure 4B:
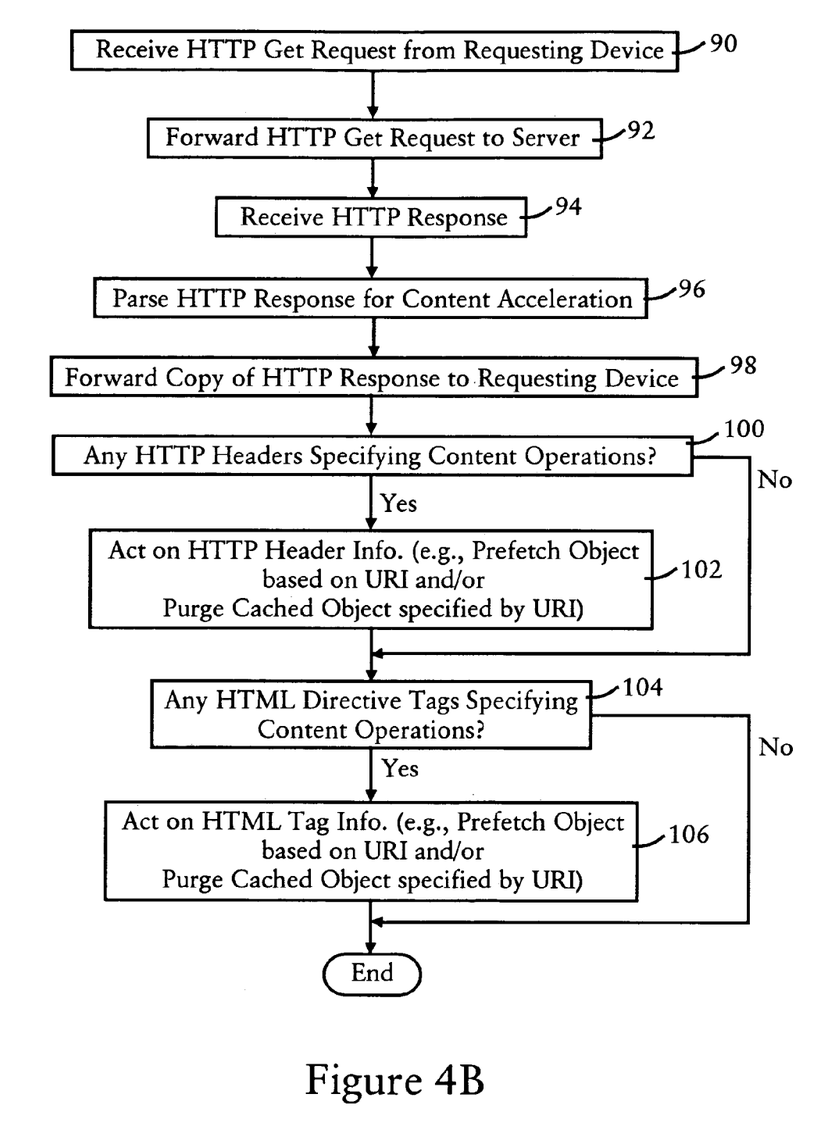

FIGS. 4A and 4B are flow diagrams illustrating the method of providing accelerated content to a device according to HTTP protocol by the web server 12 and the proxy device 16, respectively. The steps described in FIGS. 4A and 4B can be implemented as executable code stored on a computer readable medium (e.g., a hard disk drive, a floppy drive, a random access memory, a read only memory, an EPROM, a compact disk, etc.).

The method begins in step 70, where a utility resource within the web server 12b (not shown) identifies the relevant content objects for the web object 34. In particular, the utility (e.g., the commercially available BLUEFLAME™ technology from Fireclick, Inc.) identifies from the HTML page 34 the relevant content objects which are identified for example by the uniform resource identifiers 44. Alternatively the content objects can be identified manually by a webmaster. The server process 32 stores in step 72 the identified content object in the tag file 36, and generates an index that references the tag file 36 with the corresponding web object file 34. The web server 12 is then ready to process incoming HTTP Get requests.

In response to receiving an HTTP Get request for a web object in step 74, the server process 32 retrieves in step 76 the web object file 34 and the corresponding tag file 36. The server process 32 determines in step 78 whether the tag file 36 specifies the identifiers in HTTP or HTML, for example by parsing the tag file 36, or based on a prescribed name extension assigned to the tag file 36.

If the tag file is an HTTP based tag file 36b, the server process 32 inserts in step 80 the tag file content into HTTP Get response headers as illustrated in FIG. 2B. If the tag file 36 is an HTML based tag file 36a, the process server 32 adds in step 82 the contents of the tag file 36a by inline prepending the HTML tags 40 to the HTTP content 34 for generation of the modified web object file 60. The server process 32 outputs via the HTTP interface 20 a Get response, including the web object 34 and the contents of the tag file 36 to the requestor, for example the proxy device 16a and/or client device 14a.

FIG. 4B is a diagram illustrating the method by the proxy device 16a of accelerating content, according to an embodiment of the present invention. The executable resource 22 of the proxy device 16a, in response to receiving an HTTP Get request in step 90 from a requesting device, such as the client device 14b or the intermediate proxy device 16b, forwards the HTTP Get request in step 92 to the server 12b. In response to receiving in step 94 the HTTP response generated by the server 12b in step 84, the executable process 22 parses in step 96 the HTTP response headers for destination information and content acceleration information.

The executable resource 22 forwards a copy of the HTTP response to the requesting client (e.g., client device 14b and/or proxy device 16b) in step 98, and determines in step 100 whether any of the HTTP headers specify content operations in step 100. If the executable resource 22 detects extensible headers 48 specifying content operations, the executable resource 22 acts on the HTTP header information, for example as specified by the HTTP header 46a, in step 102, to perform the necessary content acceleration operation, for example prefetching the objects based on the object identifier 52, or purging a cache object specified by the object identifier 52.

Prefetching by the proxy agent 22 of objects typically is performed either as an unconditional HTTP Get, or a conditional HTTP Get (e.g., If-Modified-Since). In particular, the proxy agent 22 first checks for the existence of the content object in its cache 24 to determine if the content object has already been fetched or prefetched. Such a case may arise, for example, if the client device 14 performed a "Shift-Reload" operation (i.e., reloading the content in a new browser instance), or if the original object had changed but the related prefetched object had not changed. As apparent from the foregoing, the objects subject to prefetching should be deemed cacheable objects.

The executable resource 22 within the proxy device 16a also may parse the web content 60 in step 104 to determine the presence of any HTML directive tags 40 as specified content operations. If in step 104 the executable resource 22 detects HTML directive tags 40, the executable resource 22 acts on the HTML tag information 42 and 44 in step 106, for example to prefix the specified objects or to purge any cached objects specified by the object identifiers.

According to the disclosed embodiment, content operations relevant to a specified HTTP object can be accelerated based on providing content operation identifiers with the specified HTTP object. Hence, the content operations can be accelerated within a content network, without the necessity of additional executable resources that need to establish a communication protocol between the proxy device and the web server for prefetching of content. Rather, use of content identifiers enables relevant content operations to be accelerated without adversely effecting destination device performance.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of providing content to a device according to Hypertext Transport Protocol (HTTP), the method comprising:
   receiving an HTTP request for a first content object;
   identifying a content operation identifier that identifies a corresponding second content object determined as relevant to the first content object by a predictive caching operation, the content operation identifier including a directive for prefetching the second content object as a content operation distinct from presentation of the first content object by the device; and
   sending to the device an HTTP response to the HTTP request, the HTTP response including the first content object and the content operation identifier, enabling the device to perform the prefetching of the second content object based on receipt of the content operation identifier and distinct from the presentation of the first content object;
   wherein the sending step includes adding to the first content object a content operation tag that specifies the content operation identifier including a directive tag specifying the corresponding content operation to be performed by the device and an object identifier that specifies a location of the second content object.

2. The method of claim 1, wherein the first content object is a Hypertext Markup Language (HTML) document, the adding step including inline prepending the content operation tag into the HTML document.

3. The method of claim 2, wherein the content operation identifier further includes a second directive tag specifying purging a third content object from a cache.

4. A method of providing content to a device according to Hypertext Transport Protocol (HTTP), the method comprising:
   receiving an HTTP request for a first content object;
   identifying a content operation identifier that identifies a corresponding second content object determined as relevant to the first content object by a predictive caching operation, the content operation identifier including a directive for prefetching the second content object as a content operation distinct from presentation of the first content object by the device; and
   sending to the device an HTTP response to the HTTP request, the HTTP response including the first content object and the content operation identifier, enabling the device to perform the prefetching of the second content object based on receipt of the content operation identifier and distinct from the presentation of the first content object;
   wherein the sending step includes inserting into the HTTP response at least one extensible HTTP header that specifies the content operation identifier including the directive to be performed by the device and an object identifier that specifies a location of the second content object.

5. The method of claim 4, wherein the content operation identifier further includes a second directive specifying purging a third content object from a cache.

6. A server configured for providing content to a device according to Hypertext Transport Protocol (HTTP), the server comprising:
   an interface configured for receiving an HTTP request for a first content object and outputting an HTTP response; and
   an executable process configured for identifying a content operation identifier that identifies a corresponding second content object determined as relevant to the first content object by a predictive caching operation, the content operation identifier including a directive for prefetching the second content object as a content operation distinct from presentation of the first content object by the device, the executable process configured for supplying within the HTTP response the first content object and the content operation identifier, enabling the device to perform the prefetching of the second content object based on receipt of the content operation identifier within the HTTP response and distinct from the presentation of the first content object;
   wherein the executable process is configured for adding to the first content object a content operation tag that specifies the content operation identifier including a directive tag specifying the corresponding content operation to be performed by the device and an object identifier that specifies a location of the second content object.

7. The server of claim 6, wherein the first content object is a Hypertext Markup Language (HTML) document, the executable process configured for inline prepending the content operation tag into the HTML document.

8. The server of claim 7, wherein the content operation identifier further includes a second directive tag specifying purging a third content object from a cache.

9. A server configured for providing content to a device according to Hypertext Transport Protocol (HTTP), the server comprising:

an interface configured for receiving an HTTP request for a first content object and outputting an HTTP response; and an executable process configured for identifying a content operation identifier that identifies a corresponding second content object determined as relevant to the first content object by a predictive caching operation, the content operation identifier including a directive for prefetching the second content object as a content operation distinct from presentation of the first content object by the device, the executable process configured for supplying within the HTTP response the first content object and the content operation identifier, enabling the device to perform the prefetching of the second content object based on receipt of the content operation identifier within the HTTP response and distinct from the presentation of the first content object;

wherein the executable process is configured for inserting into the HTTP response at least one extensible HTTP header that specifies the content operation identifier including said directive to be performed by the device and an object identifier that specifies a location of the second content object.

10. The server of claim 9, wherein the content operation identifier further includes a second directive specifying purging a third content object from a cache.

* * * * *